US008739521B2

(12) United States Patent
Umeno (10) Patent No.: US 8,739,521 B2
(45) Date of Patent: Jun. 3, 2014

(54) COGENERATION APPARATUS (75) Inventor: Hiroshi Umeno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 447 days.

(21) Appl. No.: 12/837,006

(22) Filed: Jul. 15, 2010

(65) Prior Publication Data

US 2011/0011069 A1  Jan. 20, 2011

(30) Foreign Application Priority Data

Jul. 16, 2009  (JP) ................................ 2009-168102

(51) Int. Cl.
 *F01N 3/02* (2006.01)
(52) U.S. Cl.
 USPC .......................................................... 60/320
(58) Field of Classification Search
 USPC .................................... 60/320; 165/140, 141
 See application file for complete search history.

(56) References Cited

U.S. PATENT DOCUMENTS

| | | | | |
|---|---|---|---|---|
| 1,563,608 A | * | 12/1925 | Wood ............................ | 165/141 |
| 1,639,051 A | * | 8/1927 | Munday ......................... | 165/141 |
| 2,316,273 A | * | 4/1943 | Meyer et al. .................. | 165/141 |
| 2,471,317 A | * | 5/1949 | Fausek et al. ................. | 165/141 |
| 3,938,233 A | * | 2/1976 | Cannon ..................... | 29/890.052 |
| 4,736,111 A | * | 4/1988 | Linden .............................. | 290/2 |
| 4,802,100 A | | 1/1989 | Aasen et al. | |
| 4,896,830 A | * | 1/1990 | Takamatsu .................... | 237/12.1 |
| 4,911,110 A | * | 3/1990 | Isoda et al. .................. | 123/41.14 |
| 5,719,990 A | * | 2/1998 | Yang .............................. | 392/400 |

FOREIGN PATENT DOCUMENTS

| | | |
|---|---|---|
| JP | 48-53345 A | 7/1973 |
| JP | 01-092558 A | 4/1989 |
| JP | 8-4586 A | 1/1996 |

OTHER PUBLICATIONS

European Office Action dated Mar. 8, 2011, issued in corresponding European Patent Application No. 10 169 022.0.
Japanese Office Action dated Jan. 22, 2013, issued in correspopnding Japanese Patent Application No. 2009-168102, with English translation (5 pages).

* cited by examiner

*Primary Examiner* — Thomas Denion
*Assistant Examiner* — Matthew T Largi
(74) *Attorney, Agent, or Firm* — Westerman, Hattori, Daniels & Adrian, LLP

(57) ABSTRACT

In a cogeneration apparatus, a heat exchanger includes an exhaust gas passageway for passage therethrough of exhaust gas, a heat medium passageway for passage therethrough of a heat medium that gives heat energy to a water heater etc., and a water passageway for taking heat from the exhaust gas and giving the heat to the heat medium. Cooling water for a water-cooled engine is given to the water passageway. The cogeneration apparatus requires reduced numbers of the heat exchanger and pipes, and hence a reduced number of necessary component parts, so that the cogeneration apparatus can be reduced in cost.

1 Claim, 11 Drawing Sheets

(a) COMPARATIVE KNOWN EXAMPLE (b) INVENTIVE EMBODIMENT

COGENERATION APPARATUS

FIELD OF THE INVENTION

The present invention relates to cogeneration apparatus which not only generate electric energy by driving an electric generator by means of an engine but also acquire heat energy from exhaust gas to give the heat energy to a water heater and/or heating appliance.

BACKGROUND OF THE INVENTION

Cogeneration apparatus are known which not only generate electric energy by driving an electric generator by means of an engine but also acquire heat energy from hot exhaust gas, discharged from the engine, to give the acquired heat energy to a water heater and/or heating appliance. One example of such cogeneration apparatus is disclosed in Japanese Patent Application Laid-Open Publication No. HEI-8-4586 (JP-A H08-004586).

Figure 10:
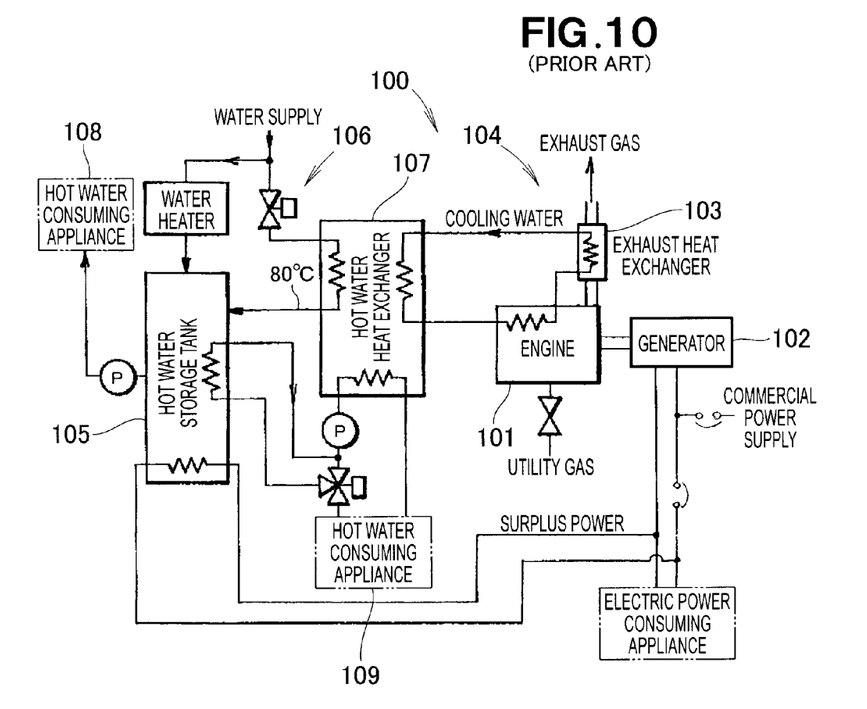
FIG. 10 is a block system diagram showing a conventionally-known cogeneration apparatus.

FIG. 10 hereof shows the cogeneration apparatus 100 disclosed in JP-A H08-004586. The cogeneration apparatus 100 generates heat energy by driving the electric generator 102 by means of the engine 101 and acquires heat energy from high-temperature exhaust gas, discharged from the engine 101, by means of an exhaust heat exchanger 103. Further, in order to recover and use heat energy, the cogeneration apparatus 100 includes a first system 104 for circulating cooling water for the engine 101, a second system 106 comprising a hot water storage tank 105 etc., and a hot water heat exchanger 107 for effecting heat exchange between the first system 104 and the second system 106.

The cooling water not only acquires heat energy by cooling the engine 101 but also acquires heat energy from exhaust gas of the engine 101 through the exhaust heat exchanger 103, so that it takes a high temperature. The thus-heated cooling water flows to the hot water heat exchanger 107 to transfer the heat energy to a low-temperature heat medium. The heat energy thus transferred to the heat medium by means of the hot water heat exchanger 107 is transferred to a hot water consuming appliance 108 and/or heat consuming appliance 109 via the hot water storage tank 105. As noted above, the cogeneration apparatus 100 includes the discharge heat exchanger 103 and the hot water heat exchanger 107 to effect the heat transfer.

However, because the discharge heat exchanger 103 and the hot water heat exchanger 107 are both relatively great in size, the cogeneration apparatus 100 tends to have a overall great size, despite a recent demand for compactization, i.e. reduction in size, of the cogeneration apparatus 100.

SUMMARY OF THE INVENTION

In view of the foregoing prior art problems, it is an object of the present invention to provide a cogeneration apparatus with a significantly reduced size.

In order to accomplish the above-mentioned object, the present invention provides an improved cogeneration apparatus, which comprises: a water-cooled engine; an electric generator drivable by the water-cooled engine to generate electric energy; and a heat exchanger for acquiring heat energy from high-temperature exhaust gas discharged from the engine and giving the acquired heat energy to a water heater and/or a heating appliance, the heat exchanger including an exhaust gas passageway for passage therethrough of the exhaust gas, a heat medium passageway for passage therethrough of a heat medium that gives heat energy to the water heater and/or the heating appliance, and a water passageway for taking heat from the exhaust gas and giving the taken heat to the heat medium, cooling water for the water-cooled engine being given to the water passageway.

Whereas the conventionally-known counterpart requires the exhaust heat exchanger for passing therethrough exhaust gas and the hot water heat exchanger for passing therethrough a heat medium that gives heat energy to a water heater etc., the cogeneration apparatus of the present invention includes only one heat exchanger that not only recovers heat from the exhaust gas but also supplies heat energy to the water heater etc. Thus, the cogeneration apparatus of the present invention requires reduced numbers of the heat exchanger and pipes, and hence a reduced number of necessary component parts, so that the cogeneration apparatus of the present invention can be reduced in size, i.e. compactized, and reduced in cost.

Preferably, the exhaust gas passageway is surrounded by the water passageway, and the water passageway is surrounded by the heat medium passageway. The exhaust gas passageway, water passageway and heat medium passageway in the present invention are provided snugly in a small region in an overlapping fashion, with the result that compactization of the heat exchange can be achieved.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
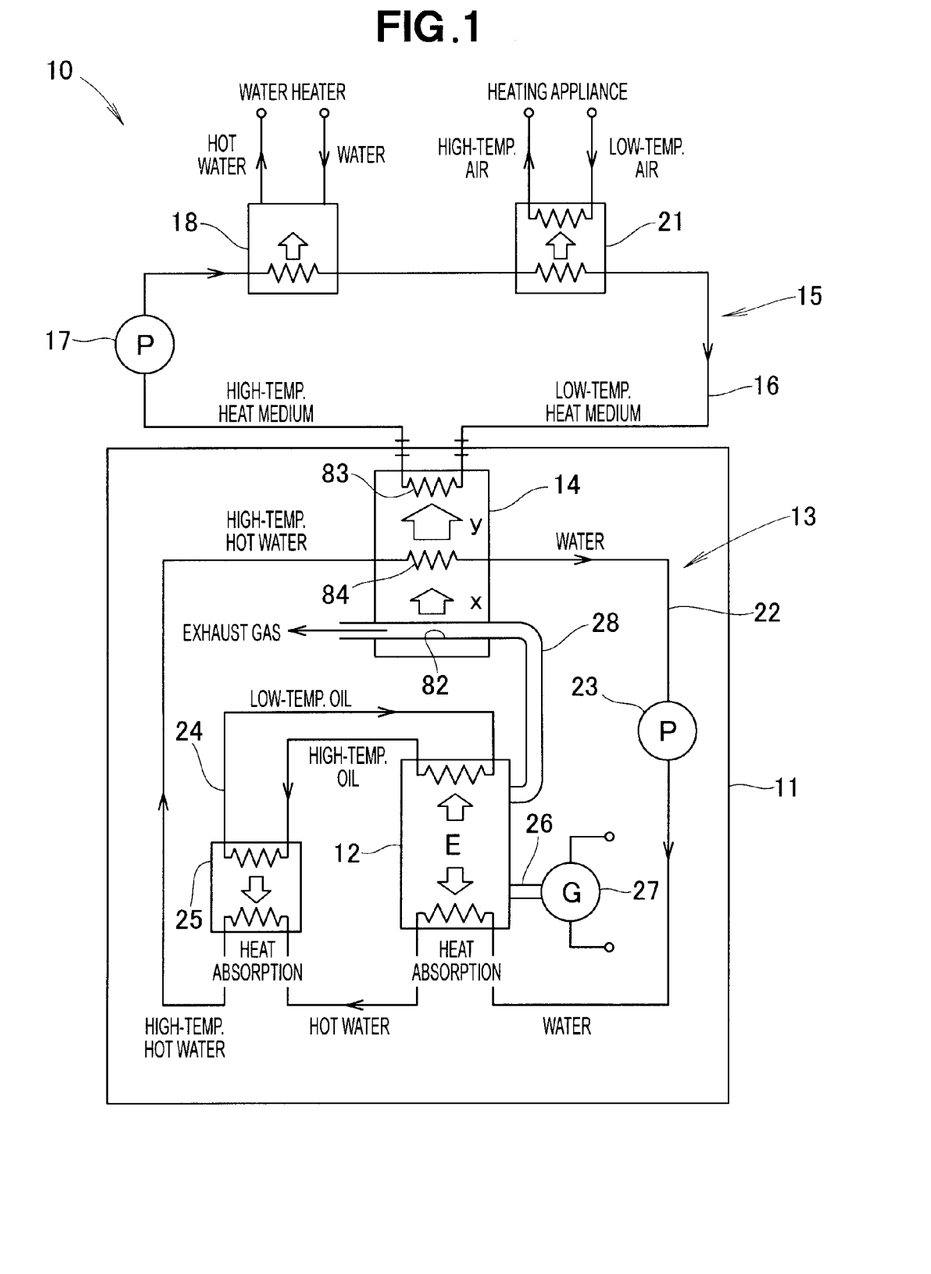
FIG. 1 is a block system diagram of an embodiment of a cogeneration apparatus according to the present invention.

Reference is now made to FIG. 1 showing in block system diagram an embodiment of a cogeneration apparatus 10 of the present invention. As shown, the cogeneration apparatus 10, which is accommodated in a housing 11, includes a first system 13 having an engine 12 as its main component, and a second system 15 that receives, via a heat exchanger 14, heat energy possessed by the first system 13.

The second system 15 includes a heat medium pipe 16 for circulating a heat medium, a medium pump 17 for circulating the heat medium, a water heater 18, and a heating device or appliance 21. "high-temperature heat medium" which has been heated via the heat exchanger 14 operates to change water into hot water via the water heater 18 and then operates low-temperature air into high-temperature air via the heating appliance 21 so that it turns into a "low-temperature heat medium".

The first system 13 includes: a water circulating pipe 22 connected to the water-cooled engine 12 for circulating water; a water pump 23 for circulating water; an oil circulating pipe 24 connected to the water-cooled engine 12 for circulating oil; an oil cooler 25 for transferring heat, possessed by the oil of the oil circulating pipe 24, to water to thereby cool the oil; an electric generator 27 connected to an output shaft or crankshaft 26 of the water-cooled engine 12 to generate electric energy; an exhaust pipe 28 for discharging high-temperature exhaust gas from the water-cooled engine 12; and a heat exchanger 14 for transferring heat energy from the exhaust pipe 28 and water circulating pipe 22 to the heat medium pipe 16.

The output of the water-cooled engine 12 is converted into electric energy by the electric generator 27, and heat E possessed by the water-cooled engine 12 is taken out via the water circulating pipe 22 and oil circulating pipe 24. Namely, "water" is warmed by the water-cooled engine 12 into "hot water" and then further warmed by the oil cooler 25 into "high-temperature hot water". This "high-temperature hot water" is supplied to the heat exchanger 14 via the water circulating pipe 22.

In the heat exchanger 14, where the "exhaust gas" supplied via the exhaust pipe 28 is hotter than the "high-temperature hot water", heat transfer is effected from the "exhaust gas" to the "high-temperature hot water". An amount of the heat transferred in this manner will hereinafter be referred to as "transferred heat amount x".

Further, because the "heat medium" is colder than the "high-temperature hot water", heat transfer is effected from the "high-temperature hot water" to the "heat medium" in the heat exchanger 14. An amount of the heat transferred in this manner will hereinafter be referred to as "transferred heat amount y".

Namely, whereas the "high-temperature hot water" is increased in temperature by the "exhaust gas", it is simultaneously cooled by the "heat medium". The heat exchanger 14 employed in the instant embodiment is constructed in such a manner that the transferred heat amount y becomes greater than the transferred heat amount x, for example, by using, as the heat medium, a low-boiling medium that evaporates at a lower temperature than water. As a consequence, the temperature decrease of the "high-temperature hot water" by far exceeds its temperature increase, so that it turns into "water".

Figure 2:
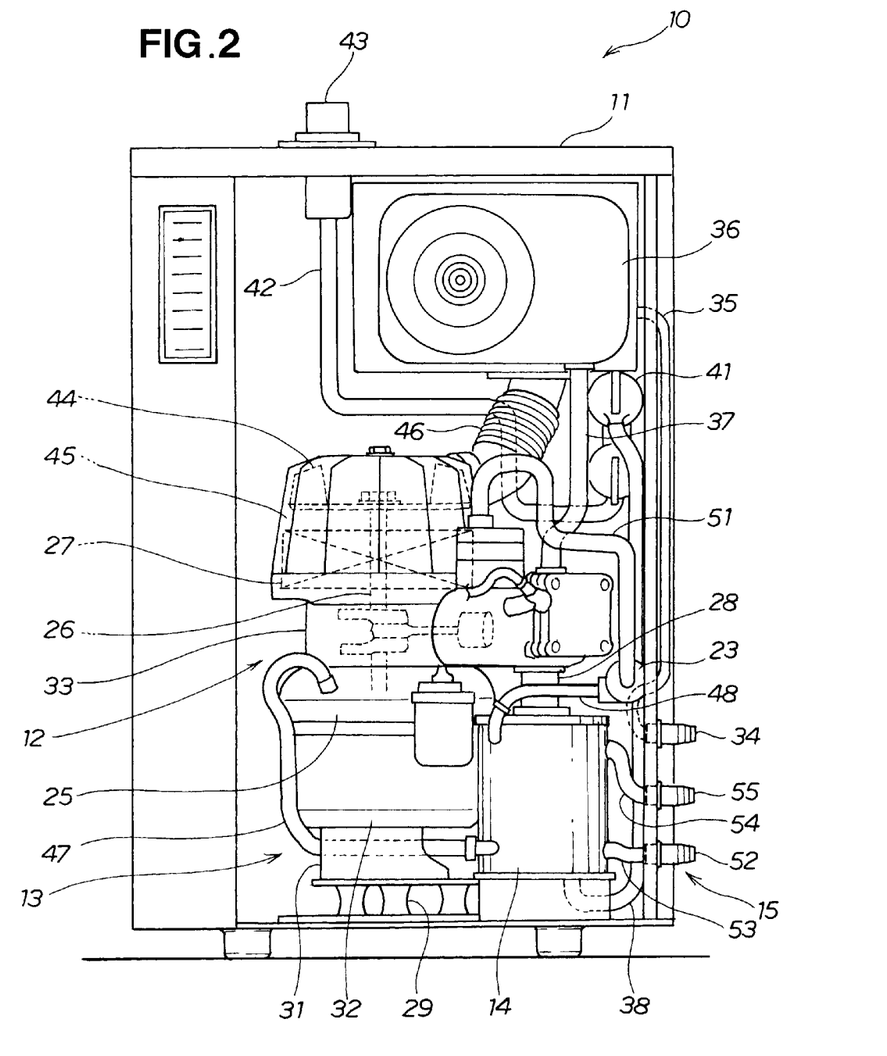
FIG. 2 is a front elevational view of the cogeneration apparatus.

The following describe an example detailed construction of the first system 13, with reference to FIG. 2. As shown in FIG. 2, the cogeneration apparatus 10 includes: the housing 11 accommodating therein the engine 12; a shock absorbing member 29 provided on a bottom portion of the housing 11 for absorbing shock; an oil pan 32 provided on the shock absorbing member 29 via a bracket 31; the oil cooler 25 provided on an upper end portion of the oil pan 32 for cooling the oil; an engine body 33 that is provided over the oil cooler 25 and generates a driving force and heat; the crankshaft 26 provided in the engine body 33 as the output shaft of the engine 12 for transmitting the driving force of the engine 12; and the electric generator 27 connected to the crankshaft 26 for generating electric energy.

The cogeneration apparatus 10 also includes: a fuel gas inlet 34 formed in a side portion of the housing 11 for introducing fuel gas; a fuel pipe 35 connected at one end to the fuel gas inlet 34 for directing the fuel gas from the fuel gas inlet 34; an air cleaner 36 provided at an entrance of an air intake system, disposed in an upper end portion of the housing 11, for removing foreign substances from intake air; and an air intake pipe 37 connected at one end to the air cleaner 36 for directing a mixture of the intake air and fuel gas to the engine body 33.

The cogeneration apparatus 10 further includes: the exhaust pipe 28 connected at one end to the engine body 33 for directing the exhaust gas from the engine body 33; the heat exchanger 14 connected to the other end of the exhaust gas 28 for acquiring heat energy from the exhaust gas; an exhaust conducting pipe 38 connected at one end to the heat exchanger 14 for directing the exhaust gas from the heat exchanger 14; a silencer 41 connected to the exhaust conducting pipe 38 for reducing exhaust sound; an exhaust conducting pipe 42 connected to the silencer 41 for directing the exhaust gas; and an exhaust outlet 43 connected to the exhaust conducting pipe 42 for discharging the exhaust gas to outside of the housing 11.

A fan 44 is connected to an end portion of the crankshaft 26, and the fan 44 sucks in air within a chamber 45 where the generator 27 is accommodated and discharges the sucked-in air through a duct 46.

Further, the first system 13, through which cooling water flows, includes: a first water circulating pipe 47 for directing the cooling water, having flown through a water jacket of the engine 12 and the oil cooler 25, to the heat exchanger 14; a second water circulating pipe 48 for directing the cooling water, having flown out of the heat exchanger 14, to the water pump 23; and a third water circulating pipe 51 for directing the cooling water, having flown out of the water pump 23, to the engine 12. The water circulating pipe 22 comprises the first to third water circulating pipe 47, 48 and 51, etc.

The second system 15, through which the heat medium flows, includes: a heat medium inlet 52 formed in a side portion of the housing 11 for introducing the heat medium; a first heat medium pipe 53 connected at one end to the heat medium inlet 52 for directing the heat medium to the heat exchanger 14; a second heat medium pipe 54 for directing the heat medium discharged from the heat exchanger 14; and a heat medium outlet 55 provided in a side portion of the housing 11 for discharging the heat medium to outside of the housing 11. The heat medium pipe 16 of FIG. 1 comprises the first and second heat medium pipes 53 and 54, etc.

Now, with reference to FIG. 3, a description will be given about a detailed construction of the heat exchanger 14 that plays the aforementioned important role in the instant embodiment.

Figure 3:
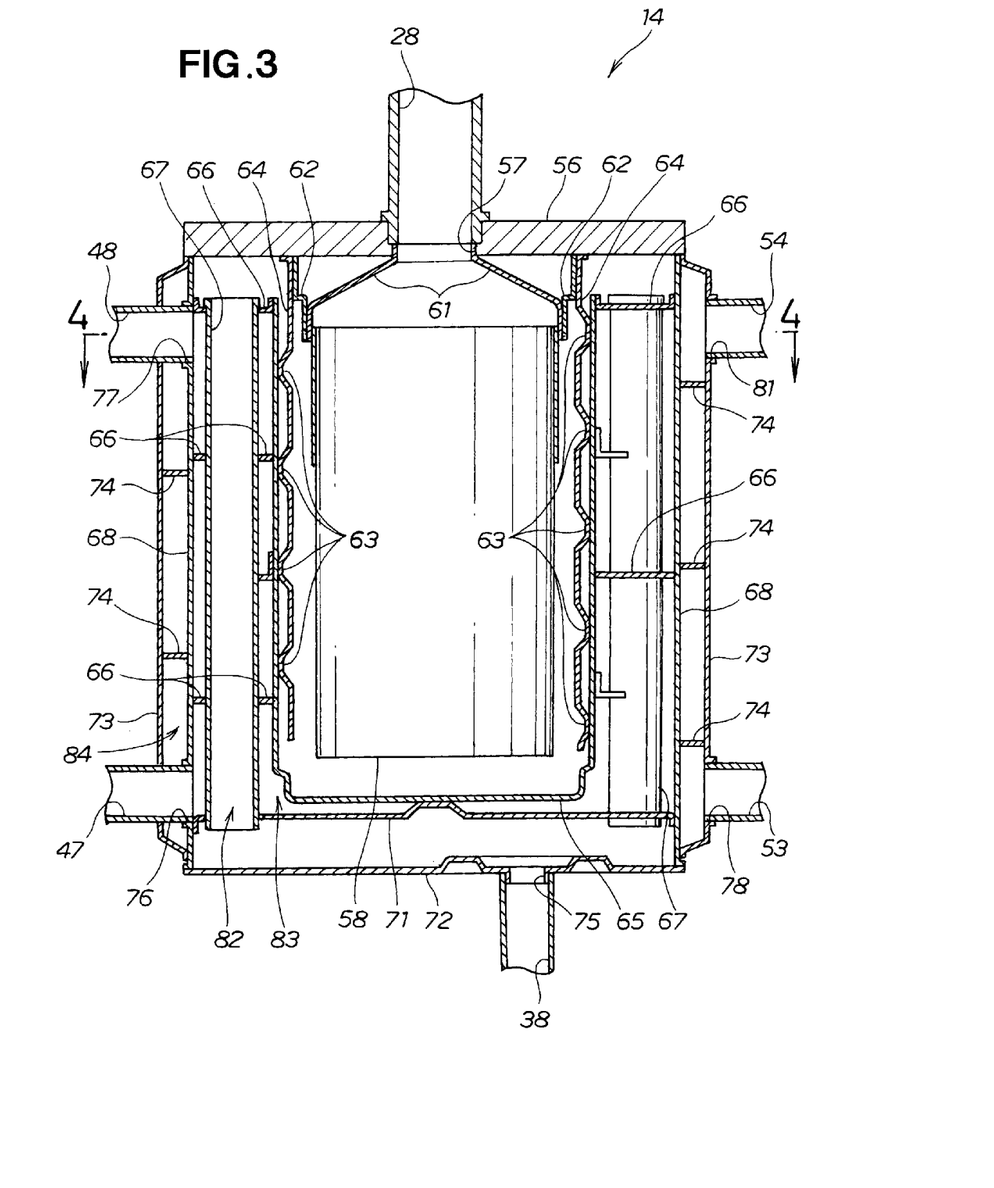
FIG. 3 is a sectional view of a heat exchanger employed in the cogeneration apparatus.

As shown in FIG. 3, the heat exchanger 14 includes: a top plate 56 to which the exhaust pipe 28 is attached at the other end; an exhaust gas inlet 57 provided centrally in the top plate 56 for taking in the exhaust gas via the exhaust pipe 28; a holding member 61 formed in a conical shape, extending downward from the underside of the top plate 56, for holding a three-way catalyst 58; a reinforcing plate 62 provided on the underside of the top plate 56 for reinforcing the holding member 61; and a cylindrical member 64 provided outside the outer peripheral surface of the reinforcing plate 62 and having a helical recess 63 in its cylindrical outer peripheral wall surface.

The heat exchanger 14 also includes: a partition member 65 provided in contact with the outer peripheral wall surface of cylindrical member 64 for partitioning the interior of the heat exchanger 14; a cooling water guide plate 66 provided outside the partition member 65 for directing the cooling water; a plurality of exhaust gas guide pipes 67 extending through the cooling water guide plate 66 for guiding the exhaust gas; and a cylindrical member 68 provided under the top plate 56 in contact with the outer surface of the cooling water guide plate 66. The heat exchanger 14 further includes: a cooling water blocking member 71 provided near a lower end portion of the cylindrical member 68 for closing the lower end portion of the cylindrical member 68 where the cooling water flows; a bottom plate 72 provided on the lower end of the cylindrical member 68 for closing the bottom of the cylindrical member 68; an outer plate 73 provided on the outer surface of the cylindrical member 68 to define the outermost wall of the heat exchanger 14; a heat medium guide plate 74 provided between the outer plate 73 and the cylindrical member 68 to guide the heat medium; an exhaust gas outlet 75 provided in the bottom plate 72; a cooling water inlet 76 and cooling water outlet 77 provided in the cylindrical member 68; and a heat medium inlet 78 and heat medium outlet 81 provided in the outer plate 73.

Figure 4:
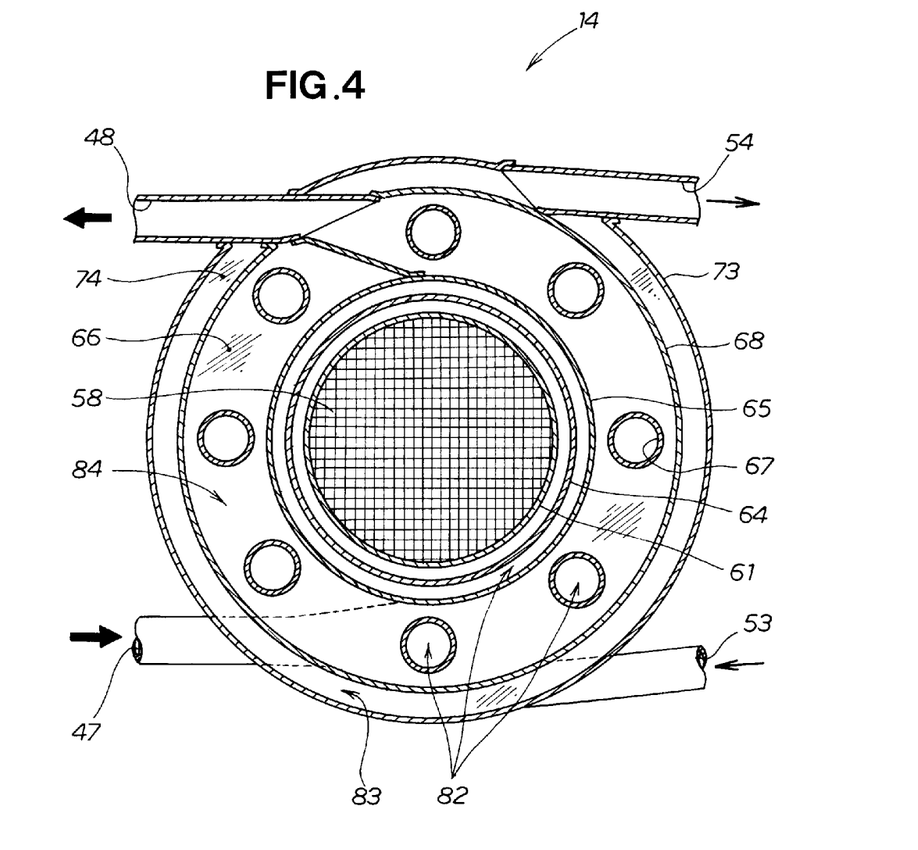
FIG. 4 is a sectional view taken along line 4-4 of FIG. 3.

The following describe passageways of the exhaust gas, cooling water and heat medium in the heat exchanger 14, with reference to FIG. 4. As shown in FIG. 4, the heat exchanger 14 includes an exhaust gas passageway 82 for passage therethrough of the exhaust gas, a heat medium passageway 83 for passage therethrough of the heat medium that gives heat energy to the water heater etc., and a water passageway 84 for taking heat from the exhaust gas and imparting heat to the heat medium. The exhaust gas passageway 82 is surrounded by the water passageway 84, and the water passageway 84 is surrounded by the heat medium passageway 83. Whereas the instant embodiment is shown as having eight exhaust gas guide pipes 67, the number of the exhaust gas guide pipes 67 may be six, ten or the like as long as the exhaust gas guide pipes 67 can transfer heat energy of the exhaust gas to the cooling water.

Figure 5:
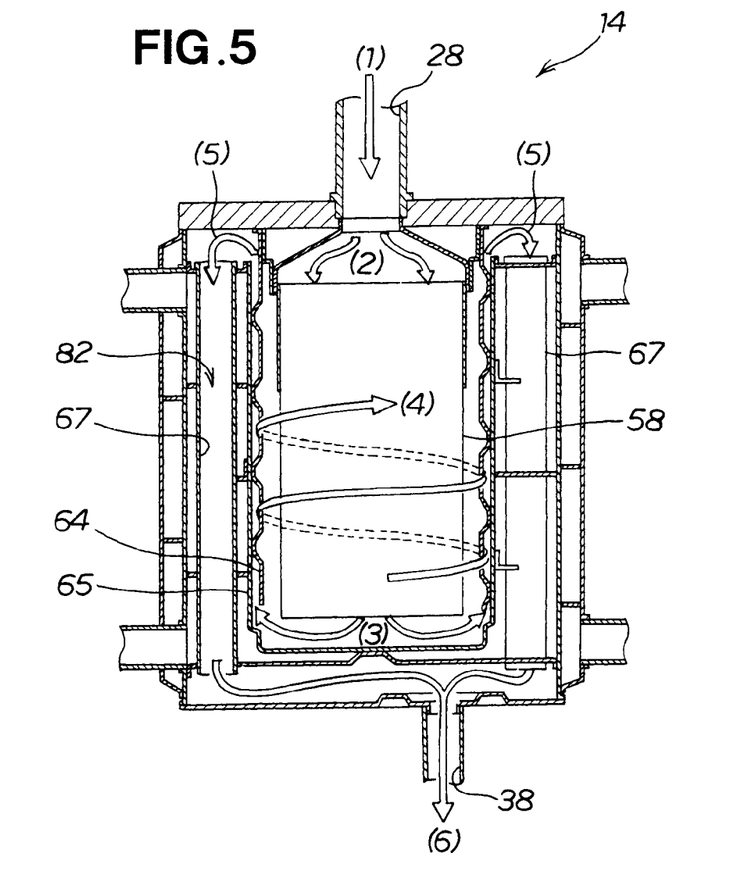
FIG. 5 is a sectional view illustrating flows of exhaust gas in the heat exchanger.
Figure 6A:
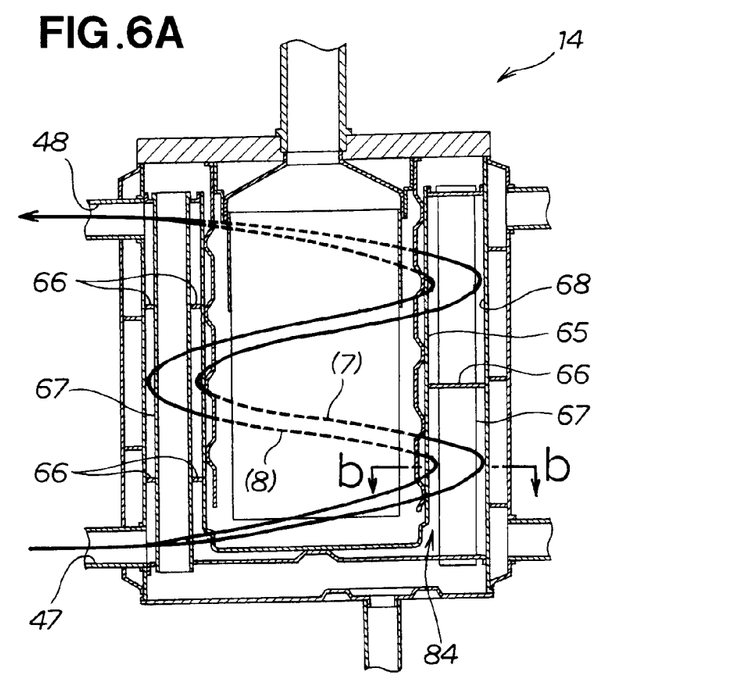
FIGS. 6A and 6B are views illustrating flows of cooling water in the heat exchanger.
Figure 6B:
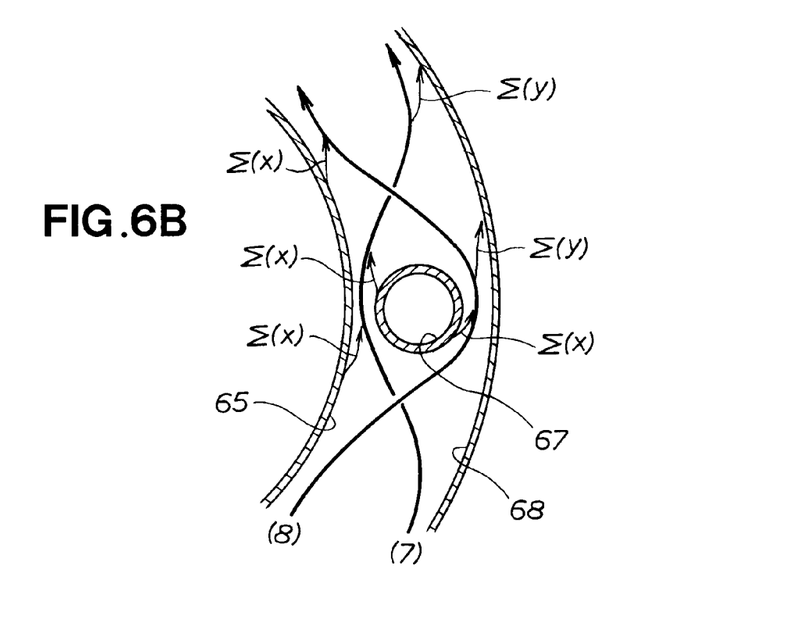
Figure 7:
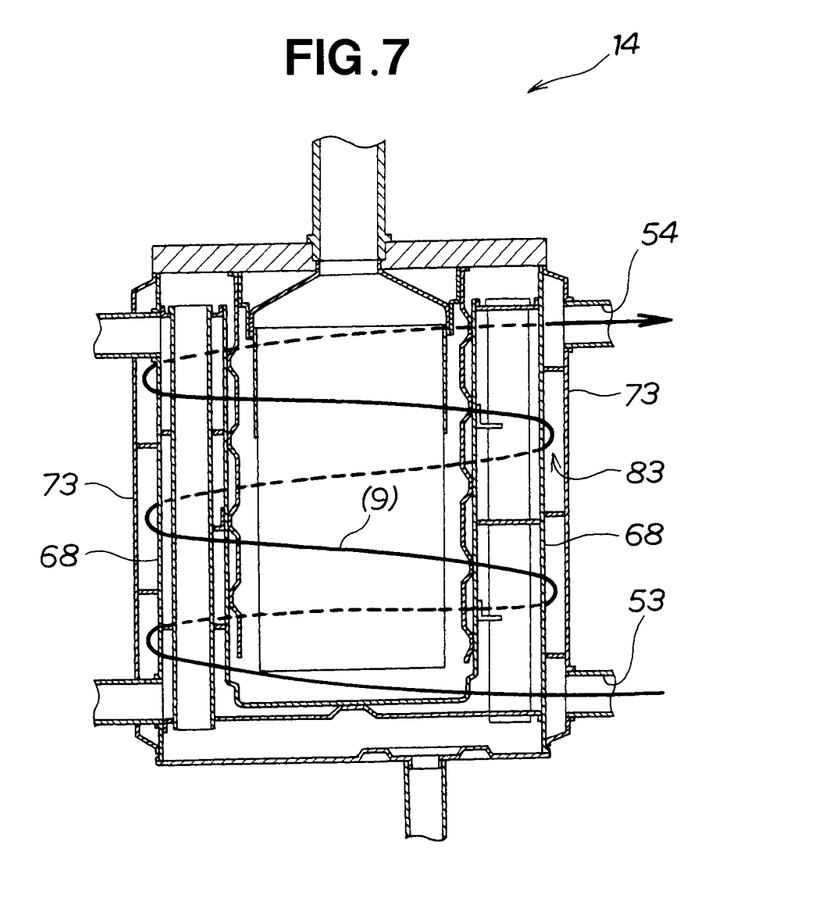
FIG. 7 is a sectional view illustrating flows of a heat medium in the heat exchanger.

Next, with reference to FIGS. 5-7, a description will be given about behavior of the heat exchanger 14. As seen in FIG. 5 which shows flows of the exhaust gas in the exhaust gas passageway 82, the high-temperature exhaust gas is introduced into the heat exchanger 14 via the exhaust pipe 28 as indicated by arrow (1) and then flows into the three-way catalyst 58 as indicated by arrows (2). The exhaust gas having flown out of the three-way catalyst 58 enters between the cylindrical member 64, having the helical recess, and the partition member 65 as indicated by arrow (3), and then flows helically along the helical recess 63 of the cylindrical member 64 as indicated by arrow (4). Then, the exhaust gas enters the exhaust gas guide pipes 67 as indicated by arrows (5) and flows out to the exhaust conducting pipe 38 as indicated by arrow (6).

The following describe flows of the cooling water in the water passageway 84. As shown in FIG. 6A, the cooling water of a high-temperature is introduced via the first water circulating pipe 47 and helically flows as indicated by arrows (7) and (8). During the helical flowing movement, the cooling water is deprived of heat to become low-temperature water and flows out to the second water circulating pipe 48.

Heat transfer occurs as follows. As shown in FIG. 6B, the cooling water flowing as indicated by arrow (7) receives heat Σ(x) from the partition member 65 and exhaust gas guide pipes 67 and transfers heat Σ(y) to the heat-medium-related cylindrical member 68. The cooling water flowing as indicated by arrow (8) acts similarly to the cooling water flow indicated by arrow (8). Namely, by the provision of the exhaust gas guide pipes 67, the cooling water flows close to both the partition member 65 and the cylindrical member 68 while meandering between the members 65 and 68, thereby achieving efficient heat transfer. In this case, the received heat Σ(x) is smaller than the transferred heat Σ(y), and, consequently, the heat of the cooling water is taken away so that the cooling water takes a lower temperature.

The following describe flows of the heat medium in the heat medium passageway. As shown in FIG. 7, the heat medium of a low temperature is introduced via the first heat medium pipe 53, flows helically as indicated by arrow (9), receives heat to become a high-temperature heat medium during the helical flow and then flows out to the second heat medium pipe 54.

Figure 8:
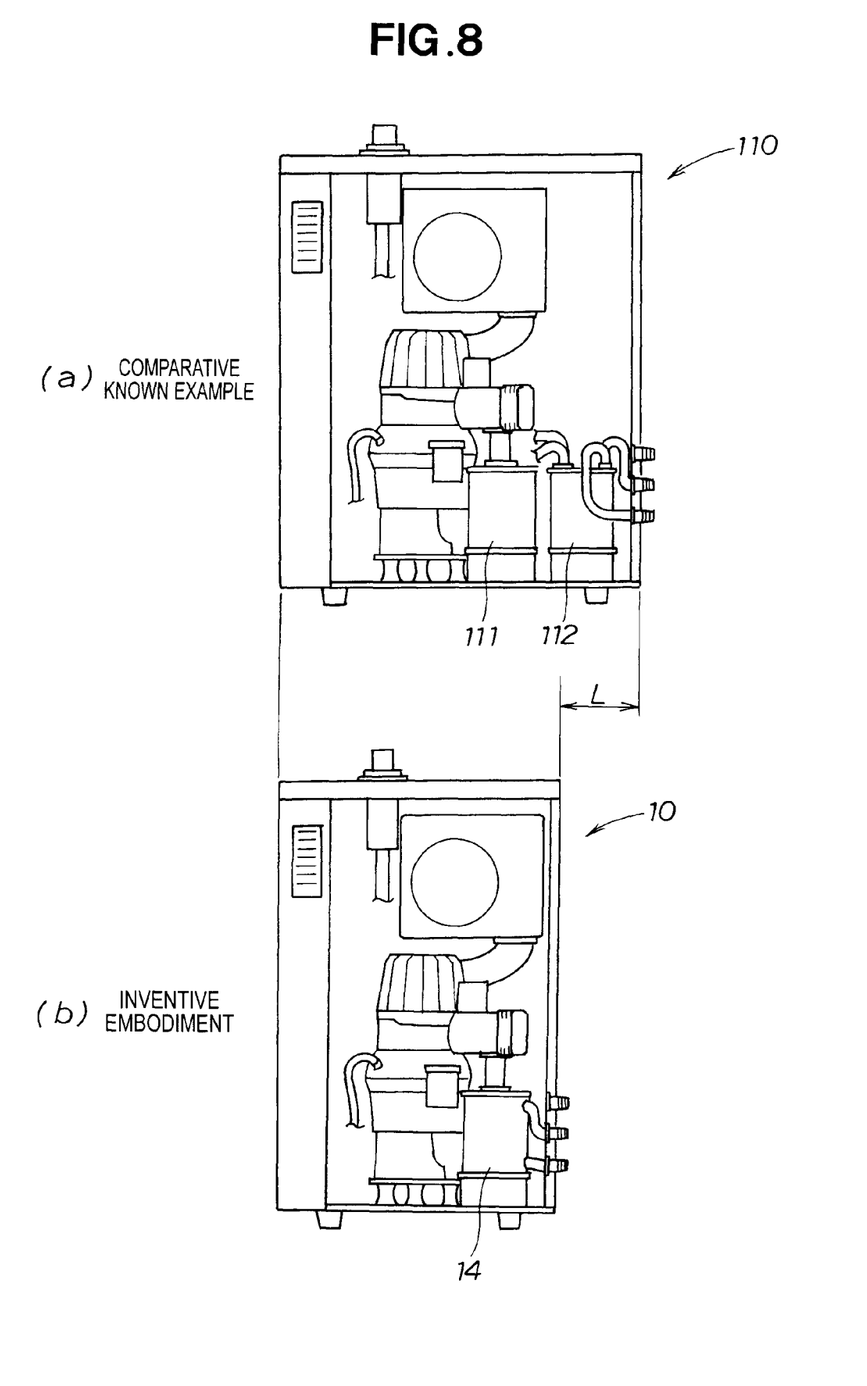
FIG. 8 is a view showing a comparative conventional cogeneration apparatus and the cogeneration apparatus according to the embodiment of the present invention, which particularly compares sizes of the two cogeneration apparatus.

The following describe how the instant embodiment of the cogeneration apparatus 10 can be compactized. (a) of FIG. 8 shows a comparative conventional example of the cogeneration apparatus 110, which includes a first heat exchanger 111 for recovering heat from exhaust gas and a second heat exchanger 112 for transferring the recovered heat to an external heat medium. Consequently, the cogeneration apparatus 110 requires a relatively great space for providing the second heat exchanger 112 and hence would increase in size.

(b) of FIG. 8 shows the instant embodiment of the cogeneration apparatus 10, which is characterized by the provision of the single heat exchanger 10 having both the function of recovering heat from the exhaust gas and the function of transferring the recovered heat to the external heat medium. Thus, the instant embodiment of the cogeneration apparatus 10 can be smaller in size, by an amount corresponding to a width L, than the comparative conventional example of the cogeneration apparatus 110.

Figure 9A:
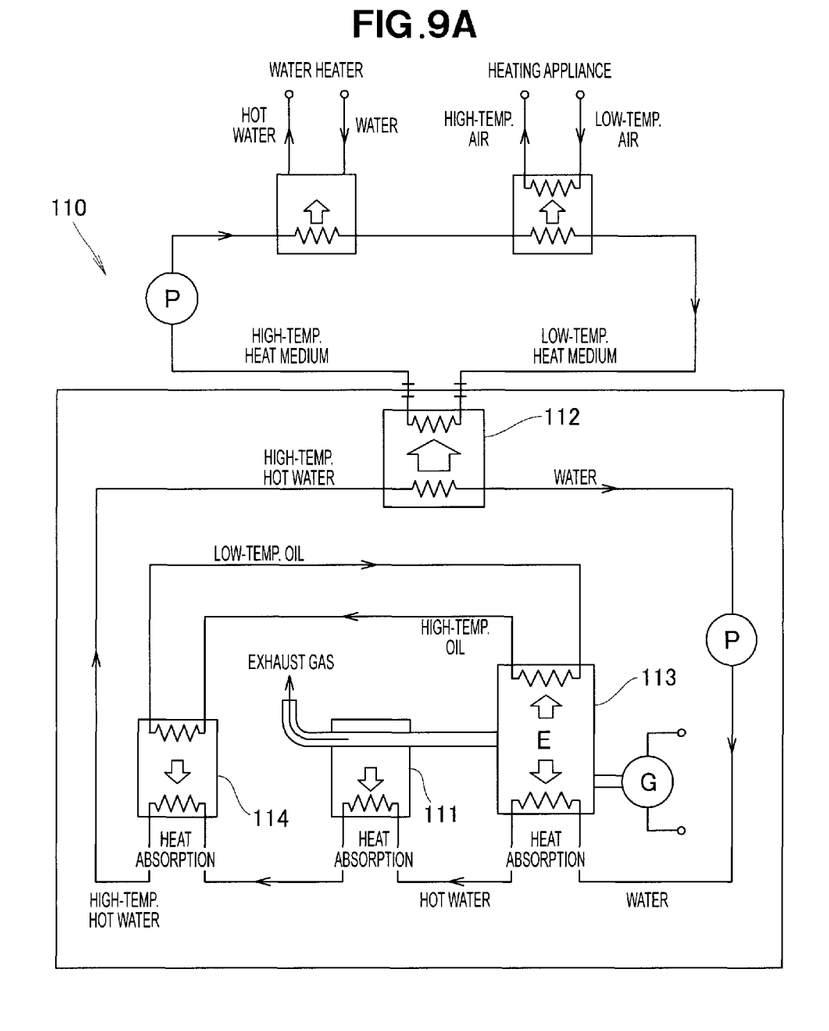
FIG. 9 is a view showing the comparative conventional example of the cogeneration apparatus and the embodiment of the cogeneration apparatus, which particularly compares component parts employed in the two cogeneration apparatus.

Further, as shown in FIG. 9A, the comparative conventional example of the cogeneration apparatus 110 includes the includes an engine 113, the first heat exchanger 111 for recovering heat from the exhaust gas of the engine 113, an oil cooler 114, the second heat exchanger 112 for transferring the recovered heat to the external heat medium, and many pipes interconnecting the above-mentioned components. Two heat exchangers 111 and 112 are employed in the comparative conventional example of the cogeneration apparatus 110.

Figure 9B:
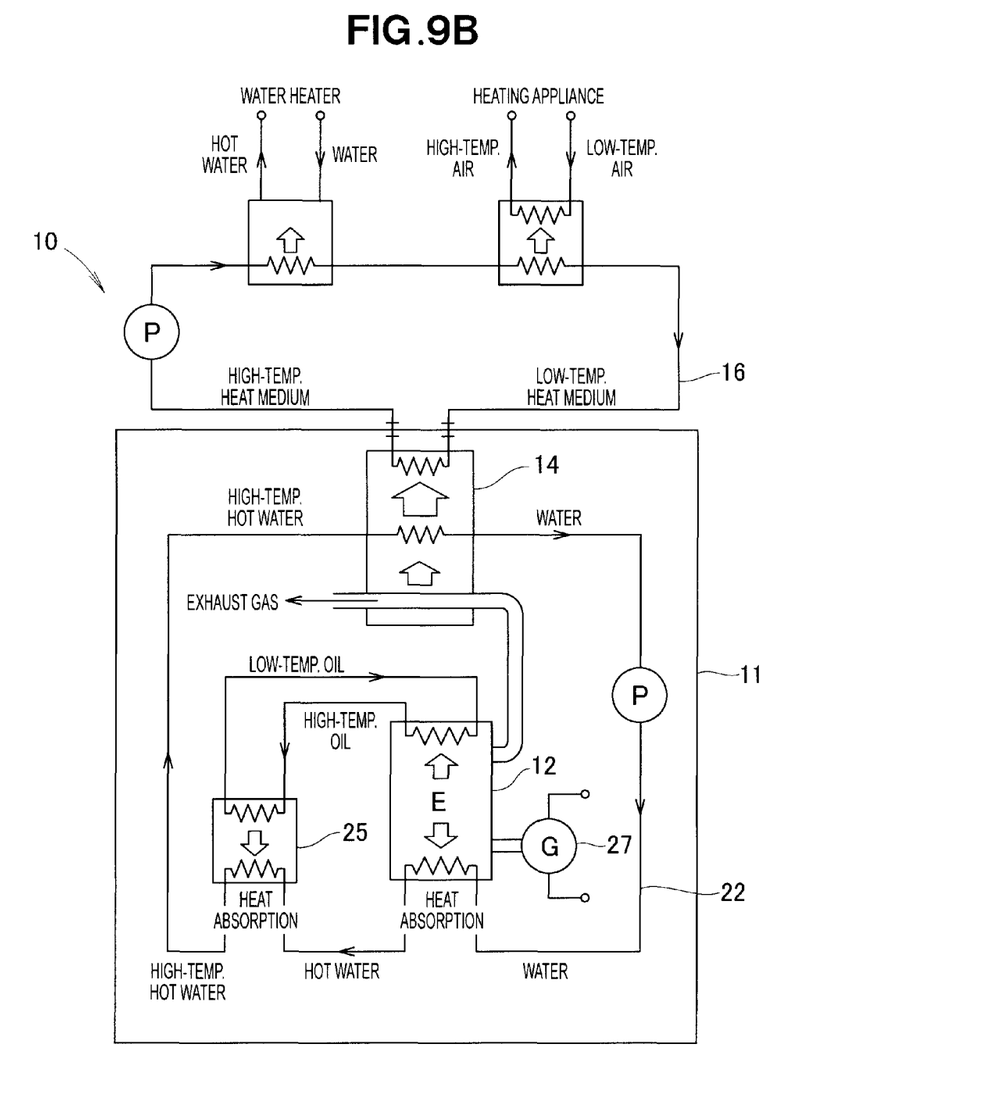

As shown in FIG. 9B, the instant embodiment of the cogeneration apparatus 10 includes the engine 12, the oil cooler 25, the heat exchanger 10 having both the function of recovering heat from the exhaust gas and the function of transferring the recovered heat to the external heat medium, and the pipes interconnecting the above-mentioned components. Namely, only one heat exchanger 14 is employed in the instant embodiment of the cogeneration apparatus 10. Thus, the instant embodiment of the cogeneration apparatus 10 has smaller numbers of the heat exchanger and pipes than the comparative conventional example of the cogeneration apparatus 110. Because of the smaller number of the component parts, the cogeneration apparatus 10 can be significantly simplified in construction and reduced in cost.

Whereas the embodiment of the cogeneration apparatus 10 of the present invention is constructed to recover heat from the oil cooler 25, it does not necessarily recover heat from the oil cooler 25, and the cogeneration apparatus 10 may be constructed in any other manner as long as it has the function of recovering heat from the exhaust gas and the function of transferring the recovered heat to the external heat medium.

The basic principles of the present invention is suited for use in cogeneration apparatus that acquires heat energy from exhaust gas and gives the heat energy to a water heater and/or heating appliance.

What is claimed is:

1. A cogeneration apparatus comprising:
   a water-cooled engine;
   an electric generator drivable by the water-cooled engine to generate electric energy; and
   a heat exchanger for acquiring heat energy from high-temperature exhaust gas discharged from the engine and giving the acquired heat energy to a water heater and/or a heating appliance,
   wherein the heat exchanger includes an exhaust gas passageway for passage therethrough of the exhaust gas, a heat medium passageway for passage therethrough of a heat medium that gives heat energy to the water heater and/or the heating appliance, and a water passageway for taking heat from the exhaust gas and giving the taken heat to the heat medium,
   wherein cooling water for the water-cooled engine is given to the water passageway,
   wherein the heat medium passageway, the water passageway, and the exhaust gas passageway are concentric with each other,
   wherein the heat medium passageway is being radially external to and surrounds both the water passageway and the exhaust gas passageway,
   wherein the heat exchanger further includes:
      a top plate having an exhaust gas inlet formed centrally therein for taking in the exhaust gas;
      a holding member formed in a conical cape and extending downward from an underside of the top plate for holding a three-way catalyst;
      a reinforcing plate provided on the underside of the top plate for reinforcing the holding member;
      a first cylindrical member provided outside the reinforcing plate and having a helical recess in an outer cylindrical peripheral wall surface thereof;
      a generally cup-shaped partition member provided in contact with the recessed outer cylindrical peripheral wall surface of the first cylindrical member for partitioning an interior of the heat exchanger;
      a cooling water guide plate provided outside the partition member for guiding the cooling water;
      a plurality of exhaust gas guide pipes extending through the cooling water guide plate for guiding the exhaust gas;
      a second cylindrical member provided under the top plate in contact with an outer surface of the cooling water guide plate;
      a cooling water blocking member provided near a lower end portion of the second cylindrical member for closing the lower end portion of the second cylindrical member where the cooling water flows;
      a bottom plate provided on a lower end of the second cylindrical member for closing a bottom of the second cylindrical member;
      an outer member provided on an outer surface of the second cylindrical member to define an outermost wall of the heat exchanger;
      a heat medium guide plate provide between the outer plate and the second cylindrical plate for guiding the heat medium;
      an exhaust gas outlet provided in the bottom plate;
      a cooling water inlet and cooling water outlet provided in the second cylindrical member with the cooling water inlet disposed below the cooling water outlet; and
      a heat medium inlet and heat medium outlet provided in the outer plate with the heat medium inlet disposed below the heat medium outlet,
   wherein the exhaust gas passageway has a first portion defined jointly by the holding member, the first cylindrical member, and a bottom part of the cup-shaped partition member and extending linearly downward from the exhaust gas inlet through the three-way catalyst to the bottom part of the partition member, a second portion defined between the recessed outer cylindrical peripheral wall surface of the first cylindrical member and a cylindrical wall part of the cup-shaped partition member and extending helically upward from a lower end of the first cylindrical member to the underside of the top plate, a third portion defined by respective cylindrical peripheral walls of the exhaust gas guide pipes and extending linearly downward from top ends to bottom ends of the exhaust gas guide pipes, and a fourth portion defined between the cooling water blocking plate and the bottom plate and extending from the bottom ends of the exhaust gas guide pipes to the exhaust gas outlet,
   wherein the heat medium passageway is defined jointly by the second cylindrical member, the outer member, and the heat medium guide plate and extends helically upward from the heat medium inlet to the heat medium outlet, and
   wherein the water passageway is defined jointly by the cylindrical part of the partition member, the cooling water guide member, and the second cylindrical member and extends helically upward from the cooling water inlet to the cooling water outlet.

* * * * *